US011350558B2

(12) United States Patent
DeChristopher

(10) Patent No.: US 11,350,558 B2
(45) Date of Patent: Jun. 7, 2022

(54) HARVESTER HEAD SUPPORT TORQUE TRANSFER MECHANISM

(71) Applicant: CNH Industrial America LLC, New Holland, PA (US)

(72) Inventor: David M. DeChristopher, Ephrata, PA (US)

(73) Assignee: CNH Industrial America LLC, New Holland, PA (US)

(*) Notice: Subject to any disclaimer, the term of this patent is extended or adjusted under 35 U.S.C. 154(b) by 374 days.

(21) Appl. No.: 16/695,845

(22) Filed: Nov. 26, 2019

(65) Prior Publication Data

US 2021/0153417 A1      May 27, 2021

(51) Int. Cl.
*A01B 63/118*    (2006.01)
*A01D 41/14*     (2006.01)

(52) U.S. Cl.
CPC .......... *A01B 63/118* (2013.01); *A01D 41/144* (2013.01)

(58) Field of Classification Search
CPC .. A01B 63/118; A01D 41/144; A01D 34/283; A01D 41/14; A01D 41/141; A01D 41/145; A01D 75/287; A01D 41/06; A01D 41/16
See application file for complete search history.

(56) References Cited

U.S. PATENT DOCUMENTS

| 3,771,302 | A | | 11/1973 | Vogt | |
|---|---|---|---|---|---|
| 4,177,627 | A | | 12/1979 | Cicci | |
| 4,313,294 | A | * | 2/1982 | Martenas | A01D 41/145 56/15.8 |
| 4,724,661 | A | * | 2/1988 | Blakeslee | A01D 43/107 56/15.8 |
| 4,871,028 | A | * | 10/1989 | Murray | A01B 73/005 172/248 |
| 4,961,303 | A | * | 10/1990 | McCarty | A01D 43/107 100/169 |

(Continued)

FOREIGN PATENT DOCUMENTS

| EP | 2156725 A2 | * | 2/2010 | ........... A01D 41/141 |
|---|---|---|---|---|
| EP | 1905294 B1 | | 7/2010 | |
| WO | 02/102138 A1 | | 12/2002 | |

OTHER PUBLICATIONS

Extended European Search Report for EP Application No. 20209353.0 dated Apr. 21, 2021 (five pages).

*Primary Examiner* — Arpad Fabian-Kovacs
(74) *Attorney, Agent, or Firm* — Peter Zacharias; Patrick Sheldrake

(57) ABSTRACT

An agricultural vehicle header having: a frame, a support arm having a proximal end rotatably mounted by a support arm pivot to the frame and a distal end spaced from the proximal end, a torque transfer anchor rigidly attached to the frame, a support torque rod having a distal end rotationally fixed to the support arm, and a proximal end rotatably mounted to the torque transfer anchor to rotate about a first axis, a frame torque rod having a proximal end rotatably mounted to the torque transfer anchor to rotate about a second axis and a distal end rotationally fixed to the frame, and a drive linkage connecting the support torque rod to the frame torque rod at the torque transfer anchor, to transfer a rotational motion of the support torque rod about the first axis into an opposite rotational motion of the frame torque rod about the second axis.

23 Claims, 7 Drawing Sheets

(56) References Cited

U.S. PATENT DOCUMENTS

| | | | | |
|---|---|---|---|---|
| 4,991,383 | A * | 2/1991 | Ermarcora | A01D 67/00 56/14.9 |
| 5,136,828 | A * | 8/1992 | Ermacora | A01B 63/00 280/43.23 |
| 7,207,164 | B2 * | 4/2007 | Bomleny | A01D 41/141 56/10.2 E |
| 7,430,846 | B2 * | 10/2008 | Bomleny | A01D 41/141 56/10.2 E |
| 7,555,885 | B2 | 7/2009 | Funk et al. | |
| 7,661,251 | B1 * | 2/2010 | Sloan | A01D 41/145 56/10.2 E |
| 7,866,133 | B2 | 1/2011 | Funk et al. | |
| 7,926,249 | B1 * | 4/2011 | Cook | A01D 75/002 56/228 |
| 7,971,420 | B1 * | 7/2011 | Bollin | A01D 41/145 56/208 |
| 8,051,633 | B2 * | 11/2011 | Figgins | A01D 34/283 56/181 |
| 8,292,328 | B2 * | 10/2012 | Honas | A01D 75/002 280/789 |
| 8,393,135 | B2 * | 3/2013 | Honas | A01D 41/142 56/181 |
| 8,402,730 | B2 * | 3/2013 | Babler | A01D 84/00 56/366 |
| 8,601,779 | B1 * | 12/2013 | Figgins | A01D 34/283 56/181 |
| 9,148,999 | B2 * | 10/2015 | Fuechtling | A01D 43/06 |
| 9,565,800 | B2 * | 2/2017 | Fay, II | A01D 57/28 |
| 2013/0284469 | A1 * | 10/2013 | Barnett | A01B 63/22 172/452 |
| 2014/0075912 | A1 | 3/2014 | Fuechtling | |

* cited by examiner

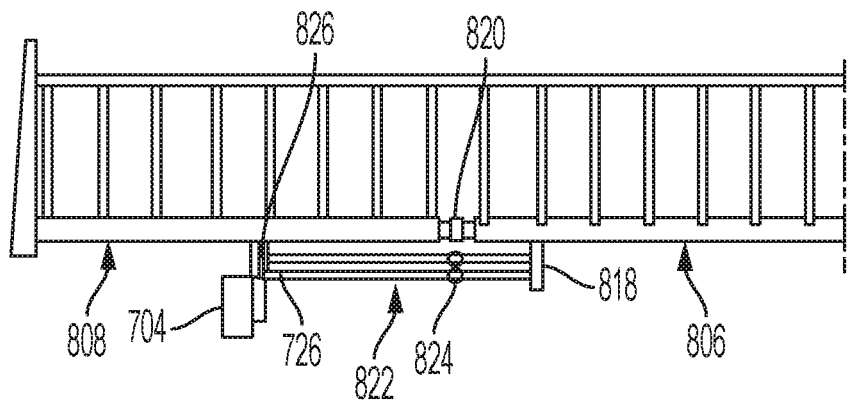
FIG. 8E
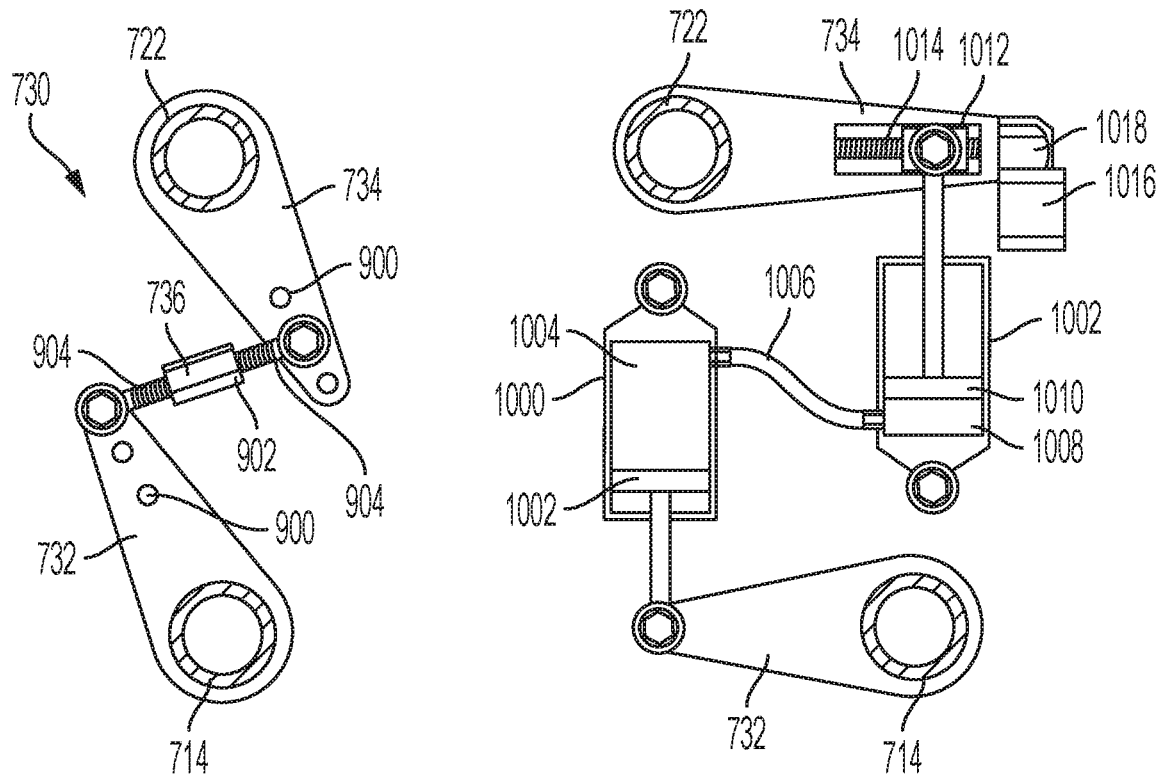
FIG. 9
FIG. 10

HARVESTER HEAD SUPPORT TORQUE TRANSFER MECHANISM

BACKGROUND OF THE INVENTION

Agricultural equipment, such as combines, swathers and windrowers, typically include a header that is movably attached to the chassis of the vehicle. During operation, the header might be raised or lowered to account for variations in the ground level, properties of the particular crop being harvested, and various other operating conditions. The header typically is located at the front of the vehicle, and extends laterally relative to the vehicle's forward direction of travel. In some cases, the header is a single rigid body. In other cases the header is a so-called multi-segment or articulated header comprising multiple sections that are movable relative to each other. For example, the header may have a center section located along the vehicle fore-aft centerline, and a wing section attached at, and extending laterally from, each lateral end of the center section. Devices such as hydraulic or pneumatic cylinders, mechanical linkages, and the like, may be provided to selectively control the heights of the center section and the wing sections. The header typically is a harvesting mechanism, but alternatively may be a sprayer beam or other laterally-elongate structure.

Headers are often designed to follow the contours of the crop field to cut the crops at a uniform height across the width of the header. To this end, the cutter bar of the header may be mounted on flexible forward-extending arms that allow the cutter bar to raise and lower according to the local ground level. Furthermore, in multi-segment headers, the wing sections are able to pivot up and down relative to the center section to obtain even more ground-following capability.

While ground-following is desirable, relatively wide harvester headers, particularly multi-segment headers, can experience significant deflection due to the weight of the header. This deflection can potentially impair proper operation of the header during transport by allowing the ends of the header to droop closer to nearby objects, and may even affect harvesting performance by cutting the crop at various heights across the header width. This deflection is also sometimes perceived as giving an undesirable appearance to the header, which can lead to customer dissatisfaction or rejection of the header in favor of other options, even if the deflection has minimal effect on the header's performance.

Header deflection can be reduced by making the parts stiffer, but this can lead to excessive weight. Thus, header design requires an optimization of stiffness and weight, and there is a continued need to advance the art of header design.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural vehicle header having: a frame extending in a lateral direction from a lateral centerline to a first frame end and a second frame end; a support arm having a proximal end rotatably mounted by a support arm pivot to the frame at a first location between the lateral centerline and the first frame end, and a distal end spaced from the proximal end; a torque transfer anchor rigidly attached to the frame between the first location and the lateral centerline; a support torque rod having a respective distal end rotationally fixed to the support arm to move with the support arm, and a respective proximal end rotatably mounted to the torque transfer anchor to rotate about a first axis; a frame torque rod having a respective proximal end rotatably mounted to the torque transfer anchor to rotate about a second axis and a respective distal end rotationally fixed to the frame at a second location; and a drive linkage connecting the support torque rod to the frame torque rod at the torque transfer anchor, to transfer a rotational motion of the support torque rod about the first axis into an opposite rotational motion of the frame torque rod about the second axis.

In some exemplary aspects, the drive linkage is configured with a 1:1 drive ratio, such that a respective magnitude of the rotational motion of the support torque rod about the first axis at the torque transfer anchor is equal to a respective magnitude of the opposite rotational motion of the frame torque rod about the second axis at the torque transfer anchor.

In some exemplary aspects, the drive linkage has a variable drive ratio.

In some exemplary aspects, the drive ratio is remotely controllable.

In some exemplary aspects, the drive linkage comprises: a drive arm rotationally fixed to the proximal end of the support torque rod; a driven arm rotationally fixed to the proximal end of the frame torque rod; and a drive link having a first end pivotally connected to the drive arm at a location offset from the first axis and a second end pivotally connected to the driven arm at a location offset from the second axis.

In some exemplary aspects, the drive linkage comprises: a drive gear rotationally fixed to the proximal end of the support torque rod; and a driven gear rotationally fixed to the proximal end of the frame torque rod and intermeshed with the drive gear.

In some exemplary aspects, the drive linkage comprises: a first hydraulic piston assembly operatively connected to the proximal end of the support torque rod; a second hydraulic piston assembly operatively connected to the proximal end of the frame torque rod; and a hydraulic circuit connecting the first hydraulic piston assembly to drive the second hydraulic piston assembly.

In some exemplary aspects, the second location is adjacent the first location.

In some exemplary aspects, the second location is between the first location and the torque transfer anchor.

In some exemplary aspects, the first location is between the second location and the torque transfer anchor.

In some exemplary aspects, the distal end of the support torque rod is rotationally fixed to the support arm at the support arm pivot.

In some exemplary aspects, a gauge wheel is rotatably mounted to the distal end of the support arm.

In some exemplary aspects, a skid is mounted to the distal end of the support arm.

In some exemplary aspects, the frame comprises a unitary frame.

In some exemplary aspects, the frame comprises a center section located at the lateral centerline, and a wing section pivotally mounted to the center section at a wing pivot located between the first frame end and the lateral centerline. In some cases, the first location may be on the wing section, and the torque transfer anchor may be located on the wing section adjacent the wing pivot. In some cases, the first location may be on the wing section, and torque transfer anchor may be located on the center section.

In some exemplary aspects, a preload on the support torque rod and the frame torque rod is adjustable. For example, the distal end of the support torque rod may be operatively connected to the support arm by a respective actuator configured to selectively reposition the distal end of the support torque rod relative to the support arm, or the distal end of the frame torque rod may be operatively connected to the frame by a respective actuator configured to selectively reposition the distal end of the frame torque rod relative to the frame. The preload on the support torque rod and the frame torque rod may be remotely adjustable.

In some exemplary aspects, the distal end of the support torque rod is directly rotationally fixed to the support arm. In other exemplary aspects, the distal end of the support torque rod is indirectly rotationally fixed to the support arm.

In another exemplary aspect, there is provided an agricultural harvester comprising a chassis configured for movement over a surface, and a header attached to the chassis and comprising. The header comprises: a frame extending in a lateral direction from a lateral centerline to a first frame end and a second frame end; a support arm having a proximal end rotatably mounted by a support arm pivot to the frame at a first location between the lateral centerline and the first frame end, and a distal end spaced from the proximal end; a torque transfer anchor rigidly attached to the frame between the first location and the lateral centerline; a support torque rod having a respective distal end rotationally fixed to the support arm to move with the support arm, and a respective proximal end rotatably mounted to the torque transfer anchor to rotate about a first axis; a frame torque rod having a respective proximal end rotatably mounted to the torque transfer anchor to rotate about a second axis and a respective distal end rotationally fixed to the frame at a second location; and a drive linkage connecting the support torque rod to the frame torque rod at the torque transfer anchor, to transfer a rotational motion of the support torque rod about the first axis into an opposite rotational motion of the frame torque rod about the second axis.

BRIEF DESCRIPTION OF THE DRAWINGS

Embodiments of inventions will now be described, strictly by way of example, with reference to the accompanying drawings, in which:

FIGS. 8A-8E are schematic views of headers with exemplary torque transfer mechanisms.

FIG. 9 illustrates an exemplary drive linkage.

FIG. 10 illustrates another exemplary drive linkage.

In the figures, like reference numerals refer to the same or similar elements.

DETAILED DESCRIPTION OF THE DRAWINGS

Exemplary embodiments of the present invention provide apparatus for reducing the deflection of headers for agricultural harvester equipment, such as combines, swathers, windrowers, and the like. It will be appreciated that other embodiments may be used in other types of machines having a similar arrangement of parts, upon incorporation of the appropriate features of the inventions herein.

Figure 1:
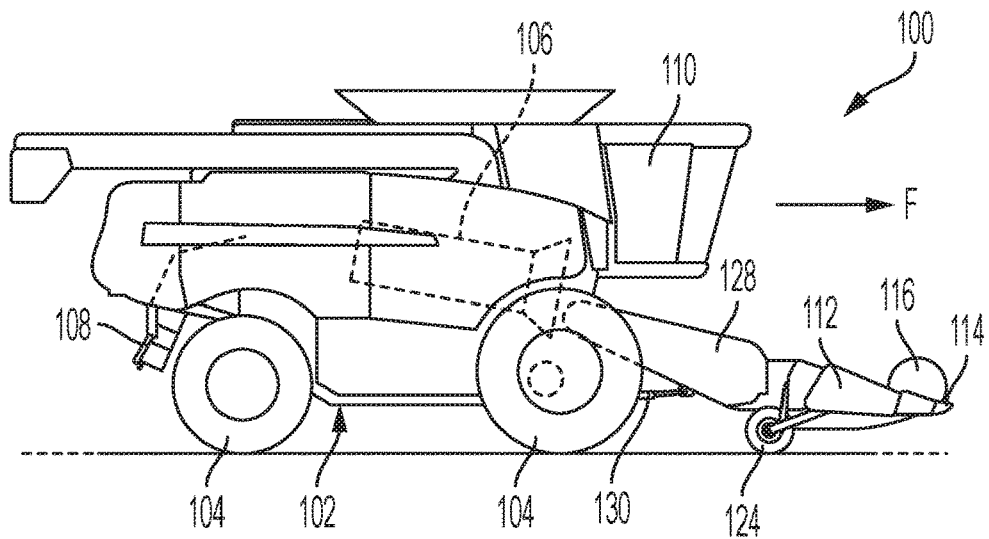
FIG. 1 is a side view of an agricultural vehicle that may include embodiments of the present invention.

FIG. 1 illustrates an example of an agricultural combine 100 with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, an operator cab 110, and so on.

Figure 2:
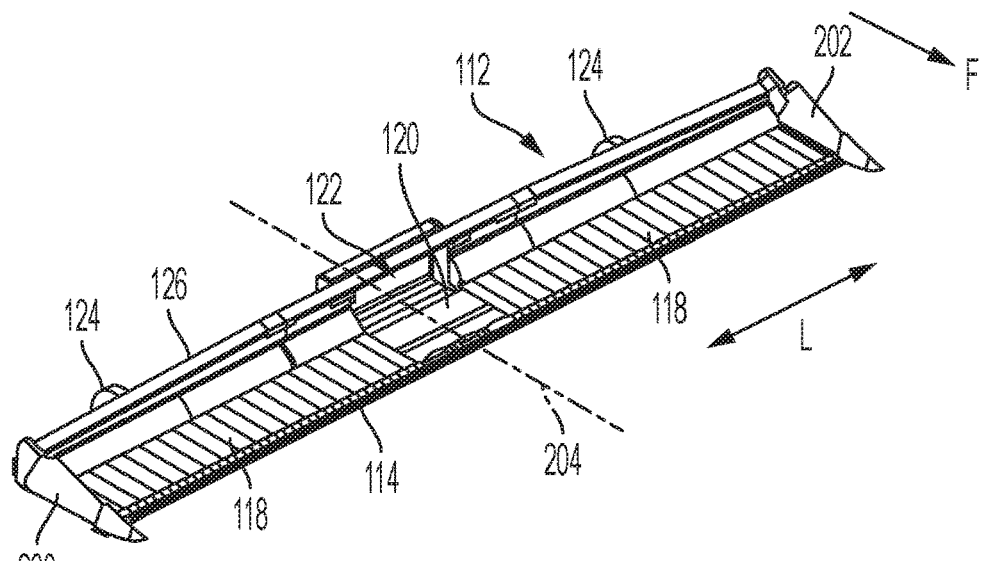
FIG. 2 is an isometric view of a unitary header that may include embodiments of the present invention.

Referring also to FIG. 2, the combine 100 also includes a header 112, which is configured to cut and harvest crop material from the ground as the combine 100 drives in the forward direction F. The header 112 extends in the lateral direction L from a first end 200 to a second end 202, with the lateral centerline 204 of the header 112 being between the first and second ends. The term "lateral" will be understood to mean a direction that is transverse to the forward drive direction F. The header 112 may include one or more cutter bars 114 located at or near the leading edge of the header 112 to cut crops at or near the ground level, and one or more reels 116 configured to pull the crop material backwards towards the header 112. The header 112 also may include crop conveyors 118 that are configured to move the crop material at the lateral ends of the header 112 towards the center of the header 112. The crop conveyors 118 may be in the form of belts, auger screws, or the like. At the center, the header 112 may include a feeder conveyor 120 that conveys the crop material backwards towards a crop outlet 122. The header 112 also may include supports in the form of gauge wheels 124 or skids to control the height of the header 112 over the ground.

The header 112 is built on a frame 126, which is attached to the chassis 102 by a feeder housing 128. The feeder housing 128 is configured to convey crop material backwards from the header 112 to the threshing and separating system 106. The feeder housing 128 may be movable by one or more actuators 130 to change the position of the header 112 relative to the ground.

Figure 3:
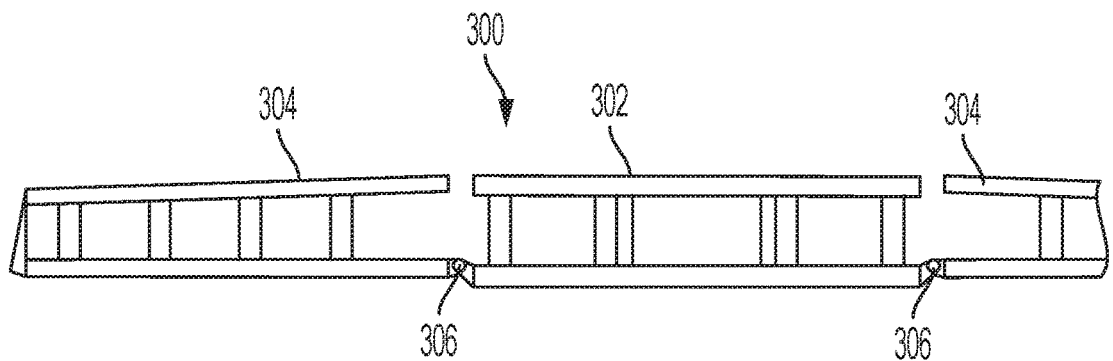
FIG. 3 is a front schematic view of a multi-segment header that may include embodiments of the present invention.

FIG. 3 illustrates the construction of a conventional multi-segment, or "articulated," header 300 having a center section 302 that extends laterally from a first end to a second end, and left and right wing sections 304 extending laterally away from the center section 302 from respective ends of the center section 302. The header 300 typically is mounted to a forward end of the chassis 102, such as shown in FIG. 1, but it may be mounted elsewhere (e.g., at the rear or at some intermediate location under the chassis 102). The shown example has two wing sections 304, but other embodiments may have a single wing section 304. The center section 302 and wing sections 304 may be constructed on frame assemblies having various frame rails and supports. Each wing section 304 is connected to the center section 302 at an articulated joint, such as a hinge 306.

Figure 4:
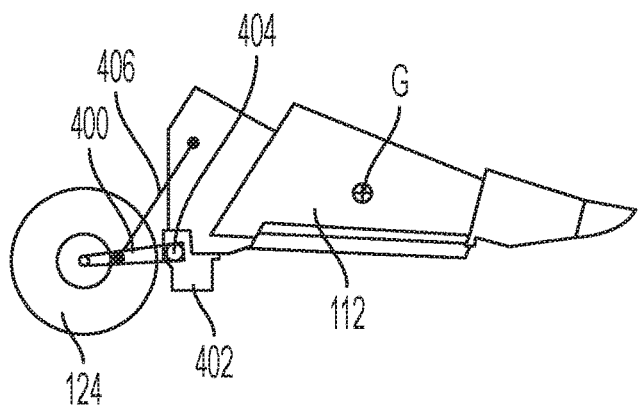
FIG. 4 is a side schematic view of a header having a gauge wheel.
Figure 5:
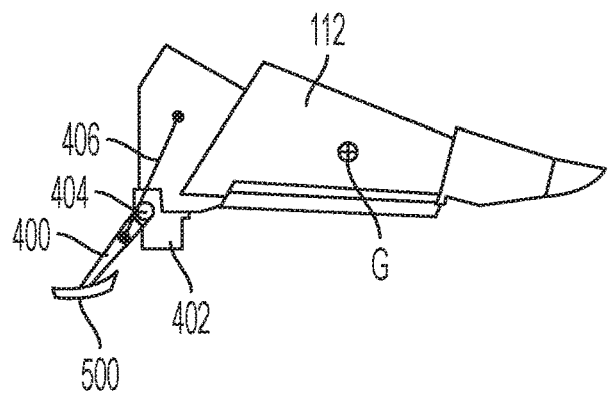
FIG. 5 is a side schematic view of a header having a skid.

As noted above, the header 112 may include one or more supports to hold the header 112 at a predetermined distance from the ground. For example, as shown in FIG. 4, a gauge wheel 124 may be mounted on a swingarm 400 that is pivotally connected to the header frame 402 at a pivot 404, such as a pivot pin or hinge. Similarly, FIG. 5 shows a header 112 having a skid 500 mounted on a swingarm 400 that is pivotally connected to the header frame 402 at a pivot 404. One or more actuators 406 (e.g., hydraulic pistons) or other mechanisms (e.g., adjustable length linkages) may be provided to hold the gauge wheel 124 or skid 500 at a desired location to hold the header 112 at a desired height above the ground, and such actuators may be rigid when set up for operation, or may allow some movement such as hydraulic damping.

While such supports are generally considered useful to help prevent unwanted changes in header height, the inventor has also found that such supports can, in some cases, accentuate deflections on the header caused by gravity and inertia. For example, in a typical header, the center of gravity G is located forward of the frame 402, and the point of contact between the support and the ground is behind the frame 402. Thus, the center of the wheel or skid contact with the ground acts as a fulcrum that tilts the header 112 forward, thus moving the leading edge of the header 112 closer to the ground and changing the orientation of the cutterbar 114 to the ground such that the cutterbar 114 is more likely to gouge or dig into the soil.

Figure 6:
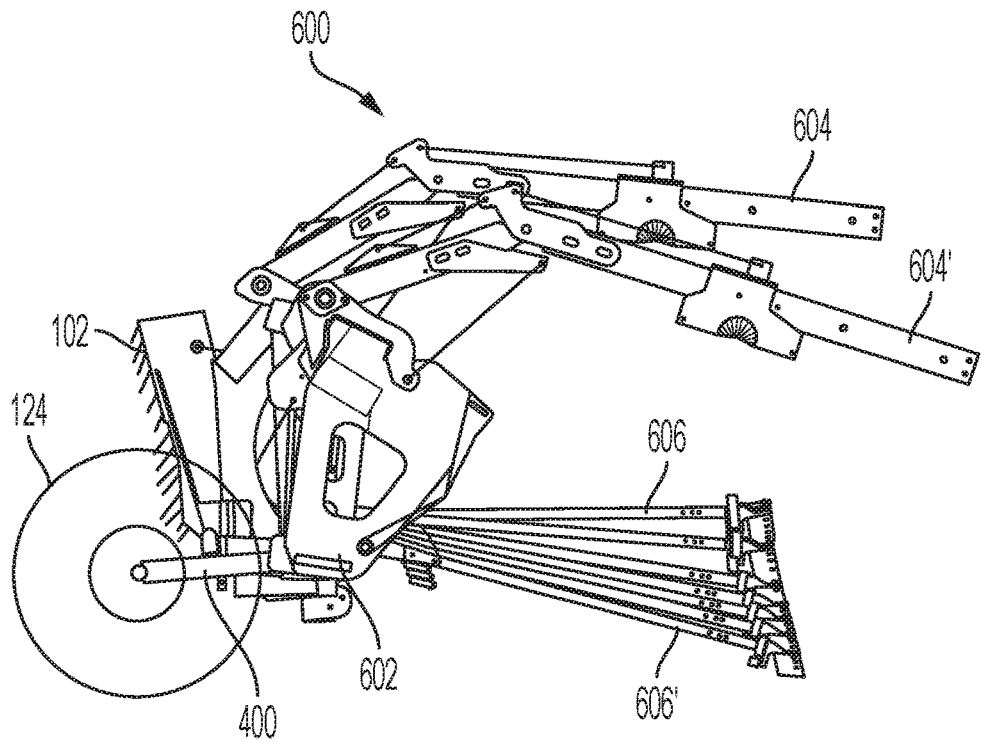
FIG. 6 is a side view of a prior art header assembly illustrating deformation thereof.

An example of this deflection is shown in FIG. 6, which is a view of a header assembly 600 comprising a frame 602, reel arms 604 and cutterbar support 606. The header assembly 600 supported on a combine chassis 102 by a feeder housing 128 or the like, with a gauge wheel 124 pivotally mounted to the header assembly 600 at the back of the frame 602 by a swingarm 400. The central portions of the header assembly 600 are more rigidly attached to the feeder housing 128, while the ends are cantilevered in the lateral direction and the front is cantilevered in the forward direction. Thus, the center reel arm 604 experiences less deflection than the reel arms 604' at the lateral ends of the header assembly 600. Similarly, the central cutterbar supports 606 experience less deflection than the cutterbar supports 606' at the lateral ends of the header assembly 600. The presence of the gauge wheel 124 exacerbates the forward tilt of the parts as the force at the contact point with the ground increases the torsion load on the header frame 602 causing more deflection than if the gauge wheel 124 were absent. Such variations in deflection can be perceived as a defect, and may in fact affect harvesting performance by cutting the crop at different heights across the header width.

Figure 7A:
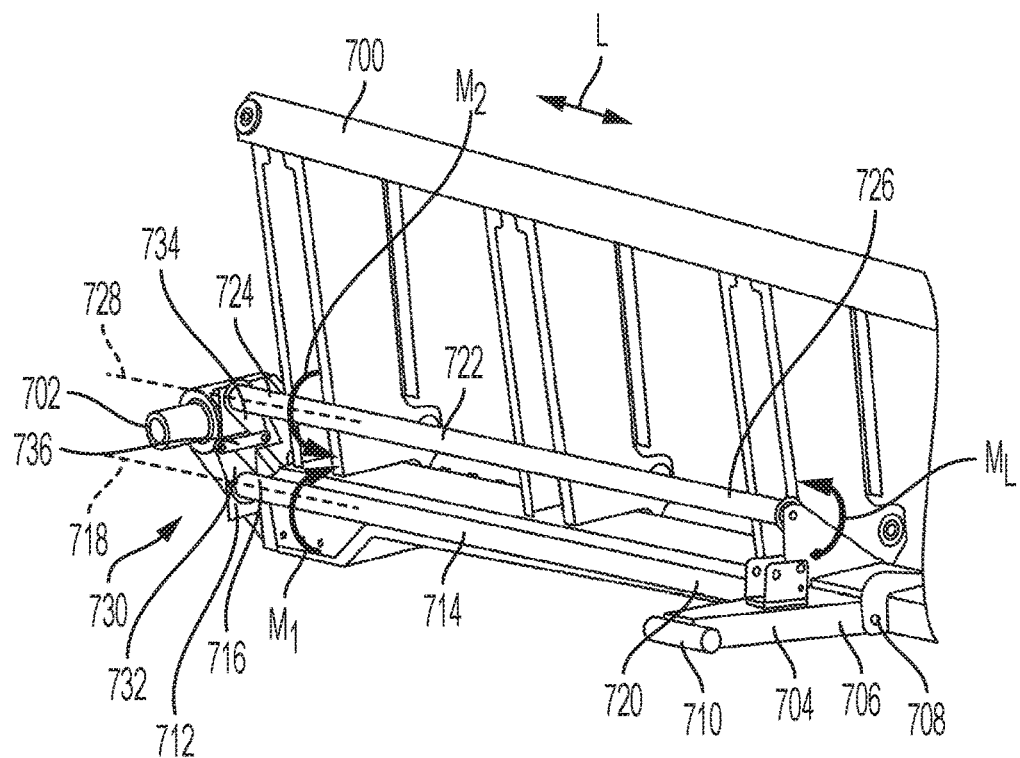
FIGS. 7A and 7B are isometric views of a header having an exemplary embodiment of a torque transfer mechanism.
Figure 7B:
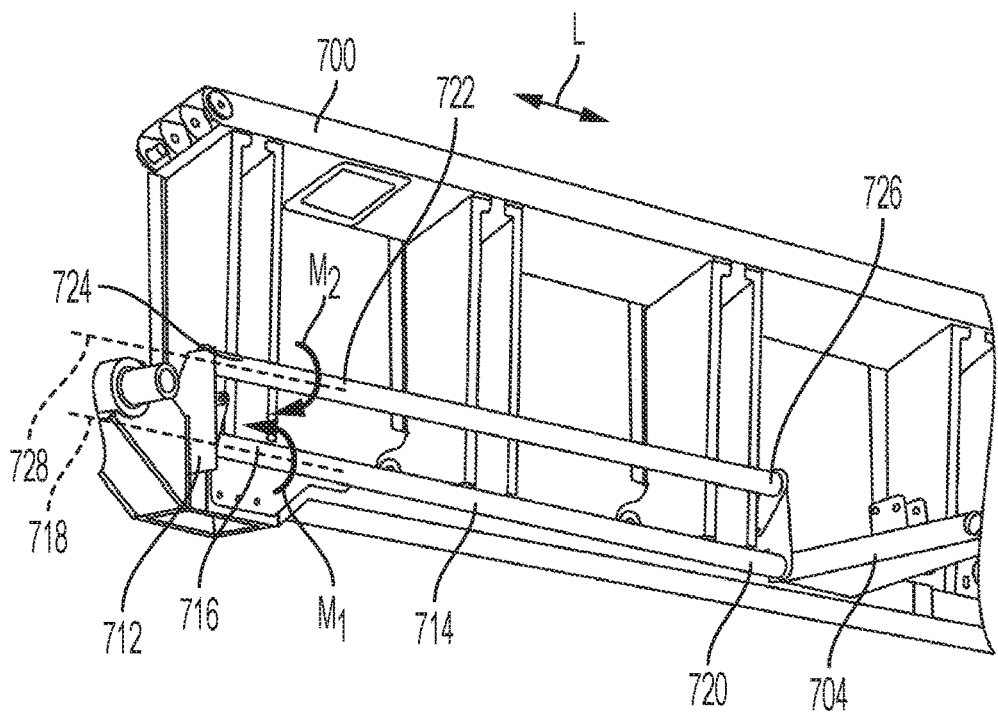

It has been found that this deflection can be mitigated by using loads generated on the support 400 to provide a counteracting moment to tilt the front of the header 112 rearward. FIGS. 7A and 7B show one example of an embodiment of a torque transfer mechanism for providing this function. The torque transfer mechanism is mounted on a header frame 700 that extends in the lateral direction L. The header frame 700 may be a unitary frame (see, e.g., FIG. 2), or it may be a multi-segment frame (see, e.g., FIG. 3). In the shown example, the illustrated portion of the header frame 700 is a wing section of a multi-segment header, which attached to a center section via a hinge 702.

The torque transfer mechanism includes a support arm 704 having a proximal end 706 rotatably mounted to the frame 700 by a pivot 708, and a distal end 710 that is spaced from the proximal end 706. The distal end 710 is configured to connect to a gauge wheel 124 by an axle or the like to allow the gauge wheel 124 to rotate relative to the support arm 704. Alternatively, the distal end 710 may be connected to a skid 500 or any other suitable support, such as a combination skid and roller assembly or the like. A skid 500 may be rigidly fixed to the distal end 710 or it may be pivotable or movable through a limited range of motion to allow it to follow ground contours.

The pivot 708 is located along the lateral direction L at a first location between the lateral centerline of the frame 700 and the lateral end of the frame 700. A torque transfer anchor 712 is located between the pivot 708 and the lateral centerline of the frame 700 (i.e., inboard of the pivot 708). The torque transfer anchor 712 is rigidly mounted to the frame 700, and comprises a relatively rigid structure, such as a flange or plate attached to the frame 700 at a rigid part of the frame 700 or via reinforcing plates or structures. In some embodiments, the torque transfer anchor 712 may be attached in proximity to or on hard points of the frame 700 that mount to the chassis 102 or feeder housing 128. In the shown example, the torque transfer anchor 712 is attached to the wing section hinge 702, which is itself a relatively robust structure as needed to support the weight of the wing section. However, attachment to a pre-existing hard point or rigid structure is not necessary in all embodiments.

A support torque rod 714 is rotatably attached at its proximal end 716 to the torque transfer anchor 712. For example, the proximal end 716 may comprise one or more internal bearings or sleeves that surround a corresponding pin extending from the torque transfer anchor 712, or the distal end 716 may be surrounded by a bearing that is attached to the torque transfer anchor 712. Thus, the proximal end 716 of the support torque rod 716 can rotate relative to the torque transfer anchor 712 about a first axis 718. A distal end 720 of the support torque rod 714 is rotationally fixed to the support arm 704 such that rotational motion of the support arm 704 about the pivot 708 causes the distal end 720 to move along with the support arm 704. For example, the distal end 720 of the support torque rod 714 may be welded or fixed by fasteners to the support arm 704 somewhere between the pivot 708 and the distal end 710 of the support arm 704. More preferably, the distal end 720 of the support torque rod 714 is rotationally fixed at the pivot 708, to thereby rotate along with the support arm 704 at the pivot 708. A rotationally-fixed connection may be provided by a fully rigid connection (e.g., welding), or more preferably by a connection that allows some relative motion along the axial direction (i.e., along the length of the support torque rod 714). For example, the pivot 708 may include a pivot pin having a protruding splined end over which an internally-splined hollow within the distal end 720 of the support torque rod 714 fits to provide a rotationally-fixed, but axially-slidable connection. The support torque rod 714 is shown as a tubular rod, but it may have other cross-sectional shapes. The support torque rod 714 also may comprise a rotational linkage, such as two rods connected by a universal or "Cardan" joint or the like.

A frame torque rod 722 is also rotatably attached at its proximal end 724 to the torque transfer anchor 712, and a distal end 726 of the frame torque rod 722 is rotationally fixed to the frame 700 at a second location. The proximal end 724 of the frame torque rod 722 is rotatable relative to the torque transfer anchor 712 about a second axis 728. The second axis 728 may be parallel to the first axis 718, but this is not strictly required. The rotational and rotationally-fixed connections of the frame torque rod 722 may be like those described above in relation to the support torque rod 714. For example, the proximal end 724 may be mounted on a bearing, and the distal end 726 may comprise internal splines that fit over a splined stub shaft that is rigidly connected to the frame. Other alternatives and variations will be apparent to persons of ordinary skill in the art in view of the present disclosure.

Figure 8A:
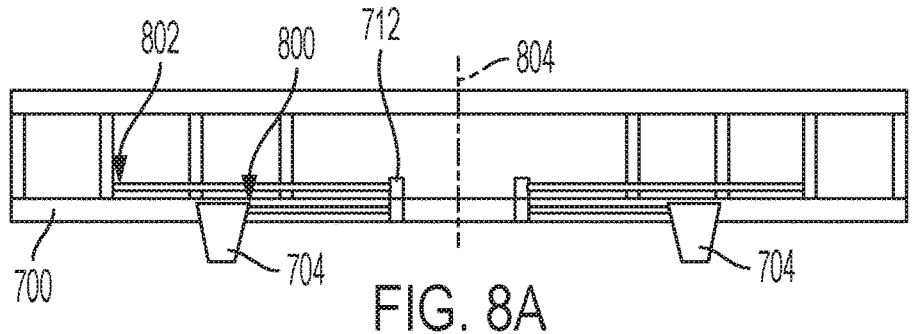
Figure 8B:
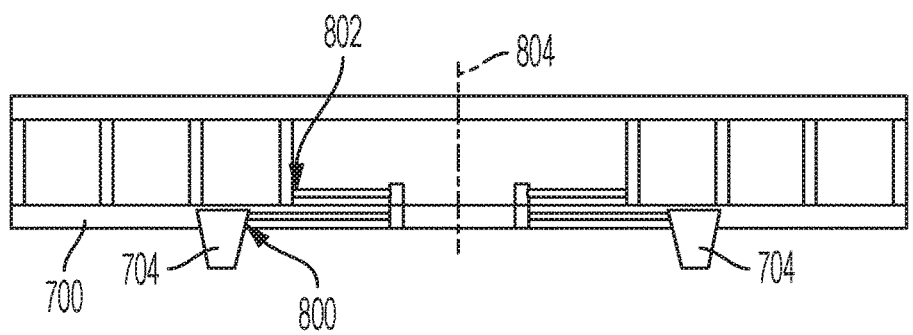

The second location (i.e., the location at which the frame torque rod 722 is rotationally fixed to the frame 700, may be adjacent to the first location (i.e., the location at which the support torque rod 714 is rotationally fixed to the support arm 704), such as shown in FIGS. 7A and 7B. However, this is not required in all embodiments. For example, as shown in FIG. 8A, the first location 800 may be between the second location 802 and the torque transfer anchor 712, or, as shown in FIG. 8B, the second location 802 may be between the first location 800 and the torque transfer anchor 712. Similarly, the torque transfer anchor 712 may be located between the first location 800 and the second location 802 and the lateral centerline 804 of the frame 700, but this is not strictly required. For example, the torque transfer member 712 may be located between the first location 800 and the second location 802, or it may be located on the opposite side of the lateral centerline 804.

Referring back to FIG. 7A, the torque transfer mechanism also includes a drive linkage 730 that operatively connects the proximal end 716 of the support torque rod 714 to the proximal end 724 of the frame torque rod 722. The drive linkage 730 is located at the torque transfer anchor 712, and may be located on either side of, or internal to, the torque transfer anchor 712. The drive linkage 720 transfers a rotational motion M1 of the support torque rod 714 about the first axis 718 into an opposite rotational motion M2 of the frame torque rod 722 about the second axis 728.

Any suitable mechanism may be used as the drive linkage 730. In FIG. 7A, the drive linkage comprises a drive arm 732 rotationally fixed to the proximal end 716 of the support torque rod 714, a driven arm 734 rotationally fixed to the proximal end 724 of the frame torque rod 722, and a drive link 736 having a first end pivotally connected to the drive arm 732 and a second end pivotally connected to the driven arm 734. The drive link 736 is connected to the drive arm 732 at a location radially offset by a first distance from the first axis 718, and to the driven arm 734 at a location radially offset by a second distance from the second axis 728. Thus, rotation of the proximal end 716 of the support torque rod 714 rotates the drive arm 732, which pushes the drive link 736 to rotate the proximal end 724 of the frame torque rod 722. The relative sizes of the offset distance between the mounting locations of the drive link 736 on the drive arm 732 and the driven arm 734 dictates the drive ratio. If the offset distances are equal, such as in FIG. 7A, the drive ratio is 1:1—meaning that the magnitude of the rotation of the proximal end 716 of the support torque rod 714 will equal the magnitude of the rotation of the proximal end 724 of the frame torque rod 722.

In operation, the gauge wheel 124, skid 500 or other support rides on the ground surface, and gravitational force and operating loads caused by traveling over rough terrain push down on the header 112. The downward force on the header acts at the center of gravity, which is located in front of the support. Such force tends to tip the header 112 forward, but also tends to drive the support and distal end 710 of the support arm 704 upwards relative to the frame 700. This causes the support arm 704 to rotate about the pivot 708, which applies a torque load on the support torque rod 714 to cause the support torque rod 714 to rotate with the support arm 704. The support torque rod 714 transfers the torque load from the distal end 720 to the proximal end 716 thereof. The support torque rod 714 may twist under the torque load, so the magnitude of rotation of the proximal end 716 may be less than the magnitude of rotation of the distal end 720.

The drive linkage 730 transfers the rotation $M_1$ at the proximal end 716 of the support torque rod 714 to the proximal end 724 of the frame torque rod 722, causing the frame torque rod 722 to rotate $M_2$ opposite the support torque rod 714. The frame torque rod 722 conveys the torque load from its proximate end 724 to its distal end 726. The distal end 726 of the frame torque tube is rotationally fixed to the frame 700. Thus, the torque load is transmitted by the frame torque rod 722 to the frame 700 at the second location, where the torque load generates a lifting moment ML on the frame 700. The lifting moment ML opposes the tendency of the front end of the header to droop downward. It has been found through computational experimentation, that the amount of droop can be reduced significantly.

It will be appreciated from the foregoing explanation that the support torque rod 714, drive linkage 730 and frame torque rod 722 also act as a sprung suspension for the support arm 704. Thus, the weight of the header 112 will exert a preload force on the parts when the header is resting on the ground, and the relative positions of the components can be adjusted to change the ride height of the header 112.

Figure 8C:
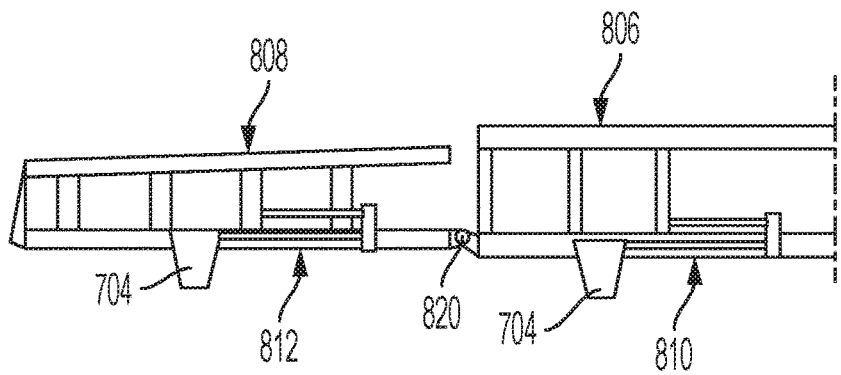
Figure 8D:
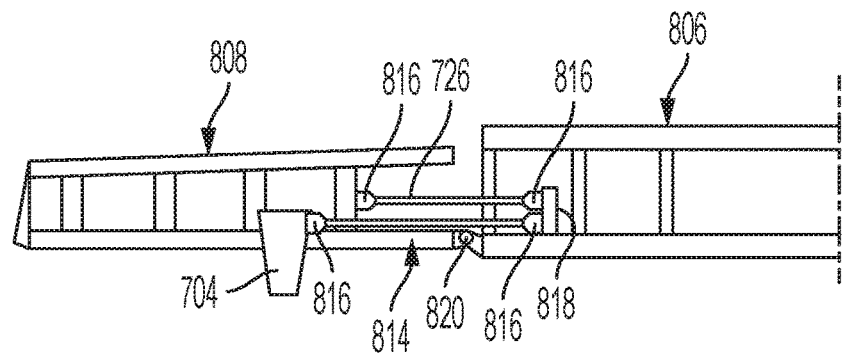

Referring now to FIGS. 8C-8E, torque transfer mechanisms such as described above may be used in rigid headers having a single continuous header section, or in multi-segmented headers having multiple movably connected header sections. For example, FIG. 8C shows a segmented header having a center section 806 and a wing section 808 pivotally attached to a lateral end of the center section 806. The center section 806 has a support arm 704 connected to an inboard torque transfer mechanism 810, and the wing section 808 has its own support arm 704 attached to an outboard torque transfer mechanism 812. In this case, each torque transfer mechanism 810, 812 operate generally independently.

FIG. 8D shows another example of a torque transfer mechanism 814, in which the header has a center section 806 and a wing section 808. In this case, the support arm 704 is located on the wing section 808, and the torque transfer anchor 818 and drive linkage (not shown) are located on the center section 806. To account for differential motion of the wing 808 relative to the center section 806 by pivoting about the pivot 820 is addressed by attaching splined ends of the support torque rod and frame torque rod to respective constant velocity joints 816 connecting the rods to the various parts. Such constant velocity joints provide uniform rotational torque transfer through a range of angular displacements, and the splined or other sliding end connections allow telescopic extension and retraction of the rods as the wing section 808 pivots relative to the center section 806.

FIG. 8E shows a schematic top view of another example of a multi-segment header with a torque transfer mechanism 822. This example is similar to that of FIG. 8D, but instead of using constant velocity joints, each rod has a universal joint 824 located on the pivot axis of the wing connection pivot 820. The support arm 704 is located on the wing section 808, and the torque transfer anchor 818 is located on the center section 806. The distal end of the frame torque rod is connected to the wing section 808 by a support 826 that conveys the torque from the rod to the frame. In this case, it may be necessary to support the rods on journals or bushings at or near the location of the universal joints to ensure continuous proper placement of the rods. Also, in this example, the rods may be arranged horizontally (i.e., one in front of the other), rather than vertically, which is expected to be a more favorable orientation for the universal joints 824 to work more smoothly. This embodiment reduces or eliminates the need to provide a sliding connection to account for differential motion of the wing section 808.

It will be appreciated that the embodiments shown in FIGS. 8C-8E show only one lateral side of the header, and the other side may include additional supports and torque transfer mechanisms in a mirror image of the shown examples, or in other configurations.

It will be appreciated that the various parts of the torque transfer mechanism may be modified in various ways. For example, FIG. 9 shows an embodiment of a drive linkage 730 in which the drive lever 732 and driven lever 734 have multiple mounting holes 900 at different radial offsets from their respective rotation axes. Thus, the drive link 736 may be connected at different radial offsets on the drive lever 732 and driven lever 734 to provide drive ratios other than 1:1. FIG. 9 also shows the drive link 736 as comprising a turnbuckle 902 that is threaded onto oppositely-turning threads on two end connectors 904 (e.g., spherical rod ends of the like). Thus, the length of the drive link 736 can be adjusted by rotating the turnbuckle 902. Such length adjustment can be used to adjust the amount of preload on the drive lever 732 and driven lever 734 to thereby adjust the static position of the support arm 704 to adjust the header ride height. Furthermore, link 736 could be replaced by an actuator (e.g., hydraulic, electronic, etc.) to provide continuous controlled length adjustment.

FIG. 10 shows another exemplary embodiment of a drive linkage 730. In this case, the drive lever 732 is operatively connected to the driven lever 734 by hydraulic piston assemblies 1000, 1002. Specifically, the drive lever 734 is configured to compress a first hydraulic piston 1002 into an associated chamber 1004 in a first hydraulic piston assembly 1000, which causes hydraulic fluid to pass through a fluid passage 1006 and into a chamber 1008 of a second hydraulic piston assembly 1002. The hydraulic fluid drives a piston 1010 of the second hydraulic piston assembly 1002, which is connected to the driven lever 736. Thus, the drive lever 732 operates to rotate the driven lever 734.

FIG. 10 also shows an example of a remotely controllable drive ratio system. Specifically, the second hydraulic piston assembly 1002 is connected to the driven lever 734 by a shuttle 1012 that is mounted on a threaded rod 1014. The threaded rod 1014 is mounted to the driven lever 734 by end supports, such as bearings, and a motor 1016 is provided to rotate the threaded rod 1014, either directly or via a gearbox 1018. Operating the motor 1016 causes the threaded rod 1014 to rotate in place, which moves the shuttle 1012 towards or away from the second rotation axis 728. The motor 1016 is electrically connected to a control system to allow an operator to remotely drive the motor 1016 in the desired direction to increase or decrease the drive ratio of the drive linkage 730. In this example, the preload on the drive lever 732 and driven lever 734 can be adjusted by changing the volume of hydraulic fluid within the system or (if a gas is used along with the fluid) by increasing or decreasing the gas pressure.

Figure 11:
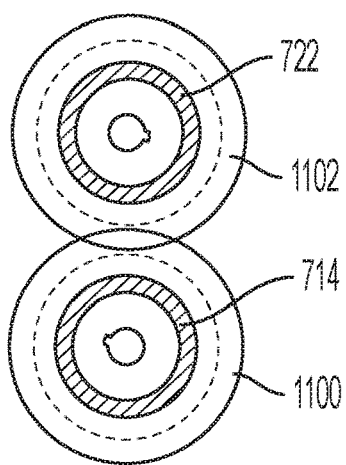
FIG. 11 illustrates another exemplary drive linkage.

FIG. 11 shows yet another example of a drive linkage 730, in which the drive lever is replaced by a drive gear 1100, and the driven lever is replaced by a driven gear 1102. The drive gear 1100 and driven gear 1102 are intermeshed, either directly or indirectly, and may comprise any kind of gear, such as straight-tooth gears, helical gears, or the like. The drive gear 1100 and driven gear 1102 also may be oriented at angles relative to one another (e.g., as in a ring and pinion gear set), and may include intermediate gears, clutches and the like.

Figure 12:
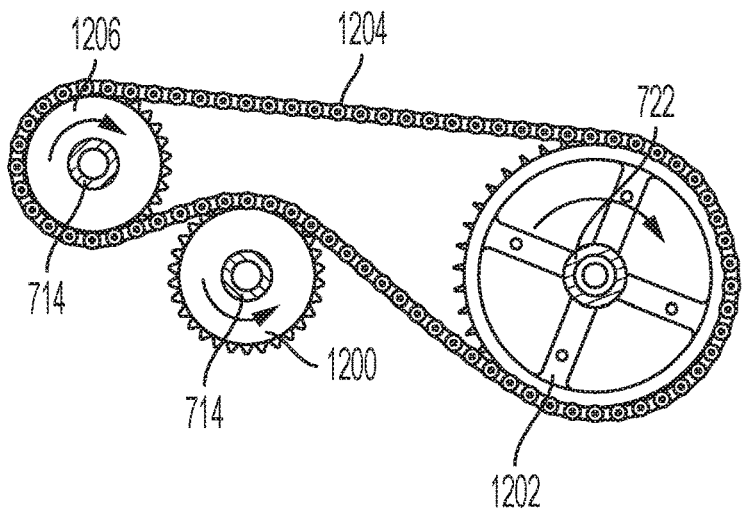
FIG. 12 illustrates another exemplary drive linkage.

FIG. 12 shows another example of a drive linkage 730, in which the drive lever is replaced by a drive sprocket 1200, and the driven lever is replaced by a driven sprocket 1202. A chain 1204 joins the drive sprocket 1200 to the driven sprocket 1202. The chain 1204 is also wrapped around an idler sprocket 1206 such that the drive sprocket 1200 and driven sprocket 1202 counter-rotate.

In other embodiments the drive linkage 730 may comprise a cable drive, a belt-and-pulley drive, a cam and follower, or other drive mechanisms. Other alternatives and variations will be apparent to persons of ordinary skill in the art in view of the present disclosure.

Figure 13:
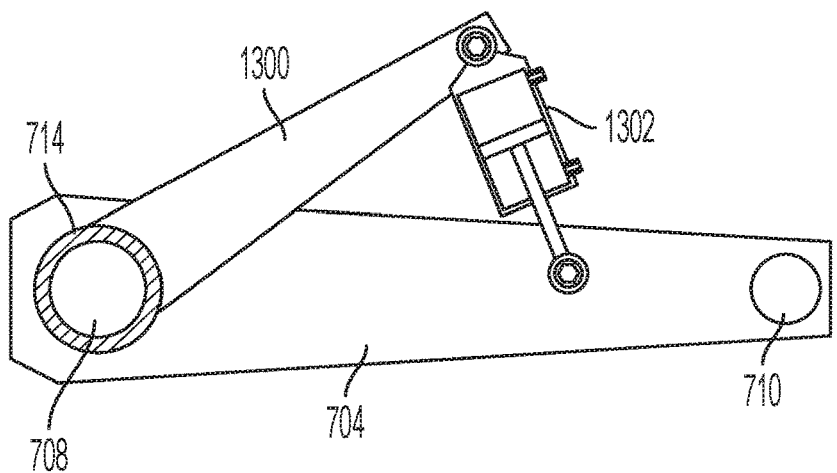
FIG. 13 illustrates an exemplary preload adjustment mechanism.

It will also be appreciated that various different mechanisms may be used to adjust the preload on the torque transfer mechanism, which can also be used to vary the cut height relative to the ground. For example, FIG. 13 illustrates an example of a preloading mechanism that adjusts the angular position of the support torque rod 714 relative to the support arm 704. The preloading mechanism includes an adjustment arm 1300 that is rotationally fixed to the distal end 720 of the support torque rod 714, and has a free end that is connected to the support arm 704 by a variable-length actuator 1302, such as a double-acting hydraulic piston assembly. In other embodiments, the variable length actuator 1302 may comprises a turnbuckle arrangement (see, e.g., FIG. 9), or the like.

Figure 14:
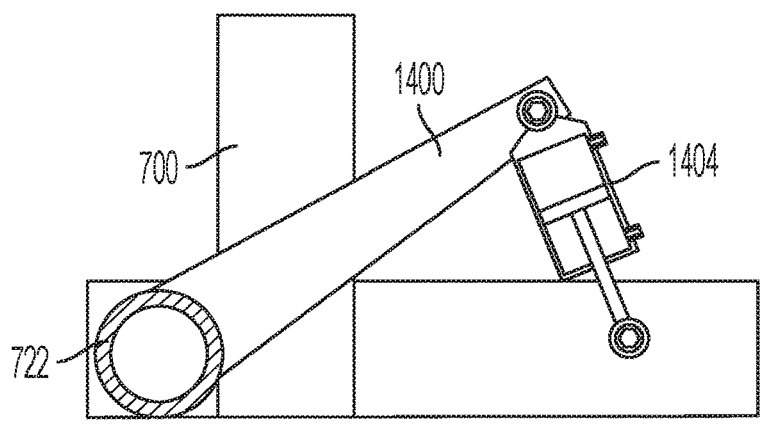
FIG. 14 illustrates another exemplary preload adjustment mechanism.

Preload adjustment also may be made (or alternatively may be made) between the frame torque rod 722 and the frame 700. For example, FIG. 14 shows an adjustment arm 1400 that is rotationally fixed to distal end 726 of the frame torque rod 722, with a free end being attached to the frame 700 by a variable length actuator 1402.

Either of the variable-length actuators 1302, 1402 may be remotely operated to adjust the preload remotely from the vehicle cabin or the like. Other alternatives and variations for manual and automatic preload adjustment mechanisms will be apparent to persons of ordinary skill in the art in view of the present disclosure.

Figure 15:
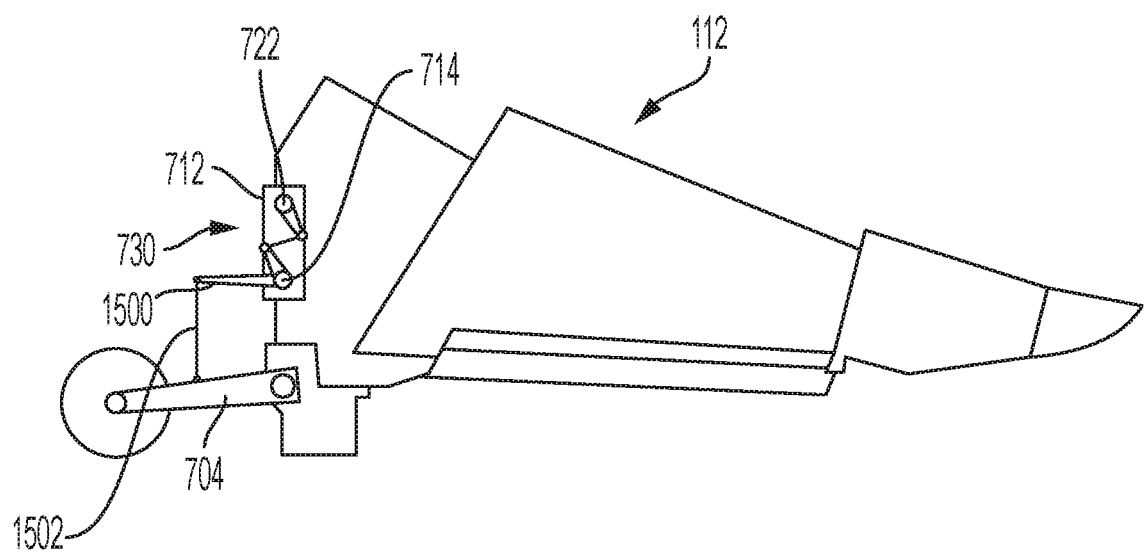
FIG. 15 illustrates an example of an indirect rotational fixation between a support arm and a torque transfer mechanism.

It will also be appreciated that various linkages may be used to connect the support arm and the frame to the torque transfer mechanism. For example, FIGS. 7A and 7B show the support torque rod 714 being rotationally fixed directly to the support arm 704 by a rigid connection, a splined connection, or the like, and the frame torque rod 722 is rotationally fixed directly to the frame 700 by a similar connection. In other embodiments, the rotational fixation may be indirect, such as by an intervening linkage. FIG. 15 shows an example of an indirect rotational fixation. Here, the support arm 704 is rotationally fixed to the support torque arm 714 by an intervening lever 1500 and link 1502. The lever 1500 is rotationally fixed to the support torque arm 714 (e.g., welded in place or mounted on splines or the like), and the link 1502 is pivotally connected to the support arm 704 and the lever 1500. Motion of the support arm 704 thus translates into a rotational motion of the support torque arm 714. Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An agricultural vehicle header comprising:
   a frame extending in a lateral direction from a lateral centerline to a first frame end and a second frame end;
   a support arm having a proximal end rotatably mounted by a support arm pivot to the frame at a first location between the lateral centerline and the first frame end, and a distal end spaced from the proximal end;
   a torque transfer anchor rigidly attached to the frame between the first location and the lateral centerline;
   a support torque rod having a respective distal end rotationally fixed to the support arm to move with the support arm, and a respective proximal end rotatably mounted to the torque transfer anchor to rotate about a first axis;
   a frame torque rod having a respective proximal end rotatably mounted to the torque transfer anchor to rotate about a second axis and a respective distal end rotationally fixed to the frame at a second location; and
   a drive linkage connecting the support torque rod to the frame torque rod at the torque transfer anchor, to transfer a rotational motion of the support torque rod about the first axis into an opposite rotational motion of the frame torque rod about the second axis.

2. The agricultural vehicle header of claim 1, wherein the drive linkage is configured with a 1:1 drive ratio, such that a respective magnitude of the rotational motion of the support torque rod about the first axis at the torque transfer anchor is equal to a respective magnitude of the opposite rotational motion of the frame torque rod about the second axis at the torque transfer anchor.

3. The agricultural vehicle header of claim 1, wherein the drive linkage has a variable drive ratio.

4. The agricultural vehicle header of claim 3, wherein the drive ratio is remotely controllable.

5. The agricultural vehicle header of claim 1, wherein the drive linkage comprises:
   a drive arm rotationally fixed to the proximal end of the support torque rod;
   a driven arm rotationally fixed to the proximal end of the frame torque rod; and
   a drive link having a first end pivotally connected to the drive arm at a location offset from the first axis and a second end pivotally connected to the driven arm at a location offset from the second axis.

6. The agricultural vehicle header of claim 1, wherein the drive linkage comprises:
   a drive gear rotationally fixed to the proximal end of the support torque rod; and
   a driven gear rotationally fixed to the proximal end of the frame torque rod and intermeshed with the drive gear.

7. The agricultural vehicle header of claim 1, wherein the drive linkage comprises:
   a first hydraulic piston assembly operatively connected to the proximal end of the support torque rod;
   a second hydraulic piston assembly operatively connected to the proximal end of the frame torque rod; and
   a hydraulic circuit connecting the first hydraulic piston assembly to drive the second hydraulic piston assembly.

8. The agricultural vehicle header of claim 1, wherein the second location is adjacent the first location.

9. The agricultural vehicle header of claim 1, wherein the second location is between the first location and the torque transfer anchor.

10. The agricultural vehicle header of claim 1, wherein the first location is between the second location and the torque transfer anchor.

11. The agricultural vehicle header of claim 1, wherein the distal end of the support torque rod is rotationally fixed to the support arm at the support arm pivot.

12. The agricultural vehicle header of claim 1, further comprising a gauge wheel rotatably mounted to the distal end of the support arm.

13. The agricultural vehicle header of claim 1, further comprising a skid mounted to the distal end of the support arm.

14. The agricultural vehicle header of claim 1, wherein the frame comprises a unitary frame.

15. The agricultural vehicle header of claim 1, wherein the frame comprises a center section located at the lateral centerline, and a wing section pivotally mounted to the center section at a wing pivot located between the first frame end and the lateral centerline.

16. The agricultural vehicle header of claim 15, wherein the first location is on the wing section, and the torque transfer anchor is located on the wing section adjacent the wing pivot.

17. The agricultural vehicle header of claim 15, wherein the first location is on the wing section, and torque transfer anchor is located on the center section.

18. The agricultural vehicle header of claim 1, wherein a preload on the support torque rod and the frame torque rod is adjustable.

19. The agricultural vehicle header of claim 18, wherein:
   the distal end of the support torque rod is operatively connected to the support arm by a respective actuator configured to selectively reposition the distal end of the support torque rod relative to the support arm; or
   the distal end of the frame torque rod is operatively connected to the frame by a respective actuator configured to selectively reposition the distal end of the frame torque rod relative to the frame.

20. The agricultural vehicle header of claim 18, wherein the preload on the support torque rod and the frame torque rod is remotely adjustable.

21. The agricultural vehicle header of claim 1, wherein the distal end of the support torque rod is directly rotationally fixed to the support arm.

22. The agricultural vehicle header of claim 1, wherein the distal end of the support torque rod is indirectly rotationally fixed to the support arm.

23. An agricultural harvester comprising:
   a chassis configured for movement over a surface; and
   a header attached to the chassis and comprising:
      a frame extending in a lateral direction from a lateral centerline to a first frame end and a second frame end;
      a support arm having a proximal end rotatably mounted by a support arm pivot to the frame at a first location between the lateral centerline and the first frame end, and a distal end spaced from the proximal end;
a torque transfer anchor rigidly attached to the frame between the first location and the lateral centerline;
a support torque rod having a respective distal end rotationally fixed to the support arm to move with the support arm, and a respective proximal end rotatably mounted to the torque transfer anchor to rotate about a first axis;
a frame torque rod having a respective proximal end rotatably mounted to the torque transfer anchor to rotate about a second axis and a respective distal end rotationally fixed to the frame at a second location; and
a drive linkage connecting the support torque rod to the frame torque rod at the torque transfer anchor, to transfer a rotational motion of the support torque rod about the first axis into an opposite rotational motion of the frame torque rod about the second axis.

* * * * *